Figure 1:
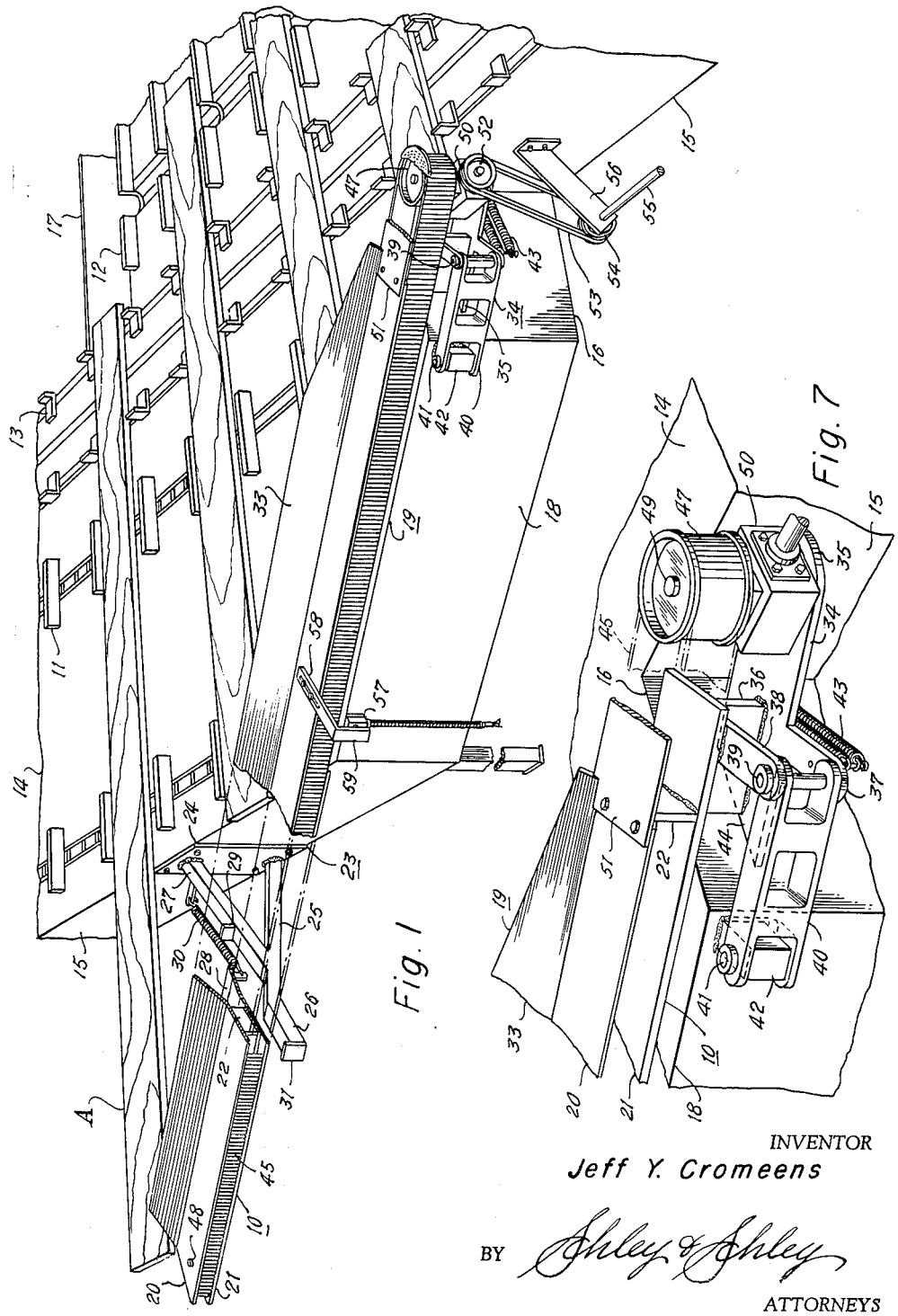

May 8, 1962  J. Y. CROMEENS  3,033,341
TRANSFER CONVEYORS
Filed Dec. 29, 1959  3 Sheets-Sheet 1

INVENTOR
Jeff Y. Cromeens
BY Ashley & Ashley
ATTORNEYS

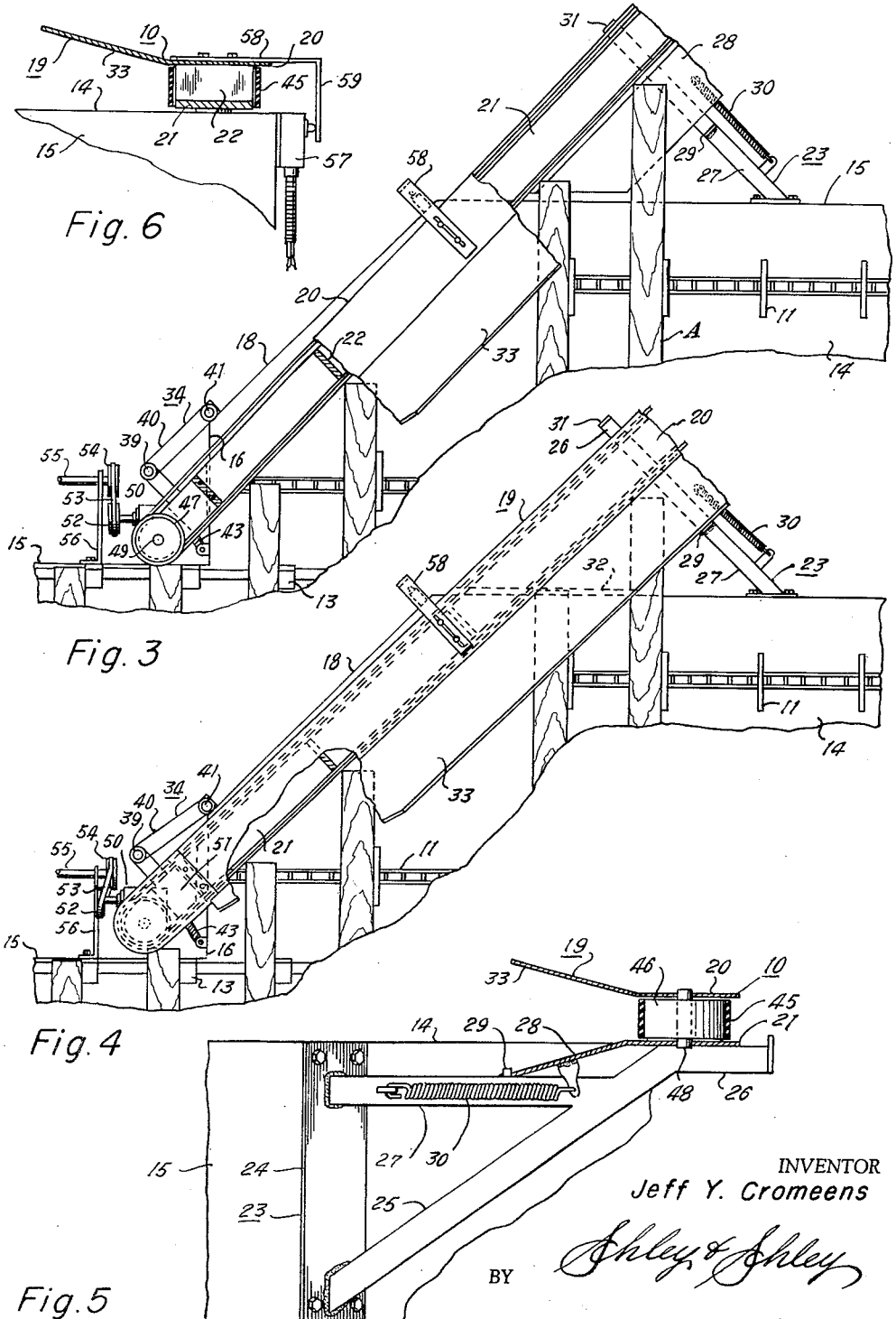

United States Patent Office 3,033,341
Patented May 8, 1962

3,033,341
TRANSFER CONVEYORS
Jeff Y. Cromeens, Mesquite, Tex., assignor to Industrial Woodworking Machine Co., Inc., Garland, Tex., a corporation of Texas
Filed Dec. 29, 1959, Ser. No. 862,524
12 Claims. (Cl. 198—20)

This invention relates to new and useful improvements in transfer conveyors.

Transfer conveyors are in common use for directing articles transversely from conveying means or for shifting articles from one conveyor to another and, frequently, impart endwise movement to lumber and other elongated articles which extend transversely of their direction of travel. In woodworking, for example, it is usually necessary to perform work on both ends of the lumber and machines are disposed in opposed, spaced relationship for such purpose with endless conveyors in side-by-side relationship for feeding said lumber to and from the machines. The transfer conveyor is disposed at an angle to or diagonally of the feed conveyors and may be of the endless type for travelling about upright axes or said conveyor may be in the form of rollers as shown in the Taylor et al. Patent No. 2,868,249, wherein an elongated, narrow conveyor extends between the feed conveyors for supporting the inner ends of the lumber. Although the endless, upright type of transfer conveyor is preferred, it is difficult to handle lumber and other elongated articles, particularly when the same vary in length and/or size, and it is virtually impossible to prevent binding of the lumber during feeding and transferring thereof. This binding may be due to warpage or other irregularity of the lumber or nonsynchronization of the feed conveyors and, usually, results in damage to the apparatus.

Accordingly, one object of the invention is to provide an improved transfer conveyor of the endless type which is pivotally mounted for swinging movement to actuate a stop switch when the articles being transferred exert a predetermined resistance to movement by the conveyor.

Another object of the invention is to provide an improved transfer conveyor of the endless type having pivotal mounting means of such construction that the conveyor may pivot in either direction to actuate a stop switch when the articles being transferred exert a predetermined force against either end portion of said conveyor.

A further object of the invention is to provide an improved transfer conveyor, of the character described, having a pivotal mounting at one of its ends which includes a pair of pivots to permit swinging movement of the conveyor in one direction about one of the pivots and in the opposite direction about the other pivot.

A particular object of the invention is to provide an improved transfer conveyor, of the character described, wherein the pivotal mounting connects the drive end of the conveyor to a support and has a member pivotally attached to the support and conveyor for movement about a pair of axes substantially parallel to the drive axis of said conveyor to permit swinging movement of said conveyor in either direction relative to said support.

A construction designed to carry out the invention will be hereinafter described, together with other features of the invention.

Figure 2:
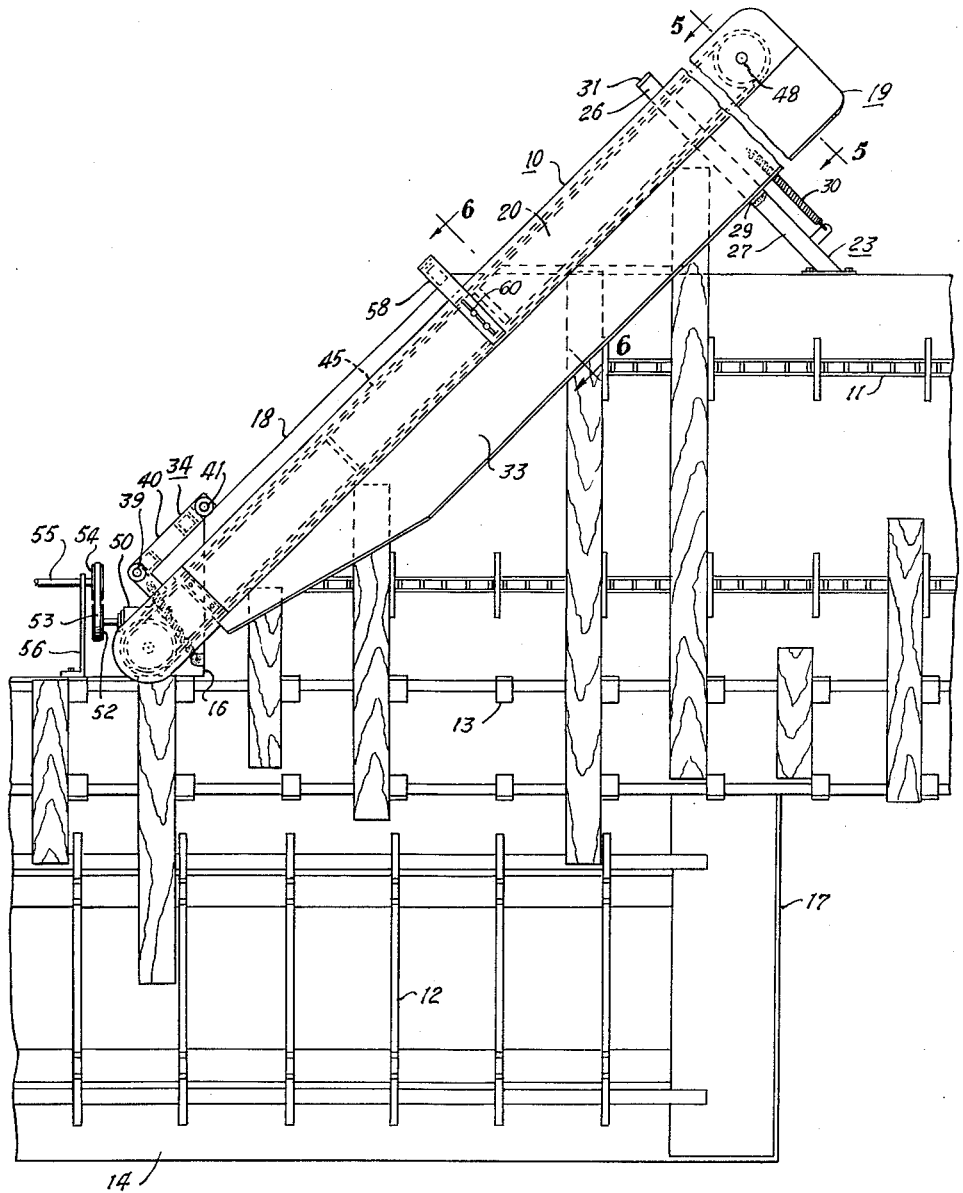

The invention will be more readily understood from a reading of the following specification and by reference to the accompanying drawings, wherein an example of the invention is shown, and wherein:

FIG. 1 is a perspective view, partly in section, of a transfer conveyor construction in accordance with the invention and mounted in coacting relation to a pair of feed conveyors, a portion of which are shown, FIG. 2 is a top plan view of the transfer and feed conveyors, FIG. 3 is a top plan view, partly in section, of the transfer conveyor pivoted counter-clockwise, FIG. 4 is a view, similar to FIG. 3, showing the transfer conveyor pivoted clockwise, FIG. 5 is an end elevational view, partly in section, of the transfer conveyor showing the slidable mounting of its outer end, FIG. 6 is a transverse, vertical, sectional view, taken on the line 6—6 of FIG. 2, showing the stop switch, and FIG. 7 is an enlarged, perspective view, partly in section, of the pivotal mounting of the inner end of the transfer conveyor.

In the drawings, the numeral 10 designates a transfer conveyor embodying the principles of the invention for directing articles A transversely from a conveyor 11 or from the latter conveyor onto a substantially parallel conveyor 12. Although the construction of the conveyors 11 and 12 are subject to variation, said conveyors are of the type employed in woodworking and similar apparatus for feeding lumber and other elongated articles to machines or stations (not shown) which are disposed in opposed, spaced relationship to perform work on opposite ends of the articles. An elongated, narrow conveyor 13 extends between the feed conveyors for coacting therewith and supporting the inner ends of the articles in the manner taught by Patent No. 2,868,249. The upper flights o the conveyors 11, 12 and 13 overlie a base or support 14 in the form of a substantially horizontal table having an upright, depending skirt or wall 15. Since the feed conveyors are diagonally disposed and have adjacent inner ends, the support 14 has offset portions which terminate in transverse margins 16 and 17 contiguous the inner ends of said conveyors (FIG. 2). As shown by the numeral 18, the major portion of the margin 16 extends at an angle between its inner portion and the longitudinal margin of the support. The wall 15 follows the marginal contour of the support and the numerals 16 and 18 designate the edge portions of said support including its margins and the portions of said wall depending therefrom.

The transfer conveyor 10 overlies the edge portion 18 of the support 14 in substantially parallel relation thereto and projects inwardly and outwardly beyond the ends of said edge portion whereby said conveyor is disposed at an angle to the feed conveyor 11 and has its inner end adjacent the conveyor 13 and edge portion 16. A frame 19 for the transfer conveyor is formed by a pair of elongated, substantially horizontal plates 20 and 21 connected in parallel, spaced relationship by a plurality of upright, cross plates or flat bars 22 (FIGS. 3 and 4). The outer end portion of the conveyor frame 19 is supported by an angular bracket 23 which has its upright base 24 bolted or otherwise secured to the wall 15 adjacent the feed conveyor 11 (FIG. 5). An arm 25 projects upwardly at an acute angle from the lower portion of the bracket base 24 toward the frame and has a substantially horizontal portion 26 at its outer end in substantial alinement with the upper surface of the support for slidable engagement by the bottom frame plate 21. Below its end portion 26, the arm 25 is connected to the upper portion of the bracket base by a substantially horizontal brace 27. An inclined flange or guide member 28 depends from the inner longitudinal margin of the bottom frame plate at its outer end portion for riding on the brace 27 and engagement with an upstanding stop element or lug 29 which limits inward movement of the outer end of the transfer conveyor 10. For maintaining the flange 28 in engagement with the stop lug 29 and resisting outward movement of the outer end of the conveyor, a helical spring 30 is suitably attached to and extends between the brace and flange. A stop element or lug 31 upstands from the outer extremity of the arm end portion 26 for engagement by the outer margin of the frame plate 21 to limit outward movement of the outer end of the transfer conveyor. As shown most clearly in FIG. 3, the flange terminates short of the wall 15 and has its inner end margin 32 substantially parallel thereto. It is noted that, in effect, the bracket 23 forms a part of the support 14.

The top frame plate 20 has a substantially coextensive flange or guide member 33 inclined upwardly and outwardly from its inner longitudinal margin for overlying and coacting with the flange 28 to direct the lumber or articles A into engagement with the transfer conveyor 10. Primarily, the flanges confine and guide the ends of the articles. The bottom frame plate 21 is of greater length than the top plate and projects inwardly thereof for connection with an underlying mounting element or bracket 34. As shown most clearly in FIG. 7, the mounting bracket includes a flat member or plate 35 extending longitudinally inward of the inner end of the frame plate in spaced, substantially parallel relationship. An upright, longitudinal plate or flat bar 36 secures the underside of the plate 21 to the upper surface of the mounting plate 35 whereby the latter forms an offset extension of the former. For pivotally attaching the conveyor frame 19 to the support 14, a pair of spaced, substantially horizontal arms 37 and 38 project transversely outward from the plates 35 and 21 and beyond the outer longitudinal margin of said frame. An upright pivot pin 39 extends between the outer ends of the arms 37 and 38 for rotatable engagement by one end of a link or member 40. The opposite end of the link 40 is journaled on an upright pivot pin 41 which is carried by a block 42 projecting from the edge portion 18 of the support 14 adjacent the edge portion 16. Due to this arrangement, the inner end of the transfer conveyor 10 is pivotally supported for movement about the axes of the pivot pins. Outward movement of the conveyor is resisted by one or more helical springs 43 which are suitably attached to the edge portion 16 and the arm 37 of the mounting plate 35. As shown by the numeral 44, the latter plate has an end margin complementary to and for engagement with the edge portion 16 to maintain the transfer conveyor in its desired operating position in coaction with the stop lug 29 and springs 30 and 43.

An upright endless belt 45 is supported by pulleys 46 and 47 having upright shafts 48 and 49 and extends longitudinally of the conveyor frame 19 between the plates 20 and 21 and externally of the cross bars 22. The shaft 48 extends between the outer ends of the frame plates for positioning the pulley 46 therebetween. An underlying gear box 50 is drivingly connected to the shaft 49 and is carried by the projecting end portion of the mounting plate 35 for supporting the pulley 47 (FIG. 7). In order to provide access to the pulley 47 and gear box 50, a short plate 51 is bolted or otherwise detachably fastened to the inner end of the top frame plate in overlying relation to said pulley. The gear box carries a pulley 52 for connection by a belt 53 to the underlying pulley 54 of a drive shaft 55. A suitable bracket 56 projects from the wall 15 for supporting the drive shaft 55. As shown in FIGS. 3 and 4, the belt 53 permits pivotal movement of the pulley 52 with the transfer conveyors relative to the drive pulley 54. For controlling the operation of the conveyors 10, 11, 12 and 13, a stop switch 57 is mounted on the edge portion 18 of the support 14 for actuation by the transfer conveyor (FIG. 6). An angular arm 58 projects transversely outward from the top frame plate 20 and has a depending portion 59 for overlying engagement with the switch 57. As shown, the arm 58 is disengaged to open the switch and stop operation of the conveyors when the transfer conveyor pivots a predetermined distance in either direction.

Counter-clockwise pivoting of the transfer conveyor 10 and opening of the switch 57 is shown in FIG. 3 and is caused by the lumber or articles A exerting a force on the outer end portion of said conveyor sufficient to overcome the tension of the spring 30. The transfer conveyor pivots about the axis of the pin 39 and moves the arm 58 out of engagement with the switch. When the articles exert sufficient force against the inner end portion of the transfer conveyor, the tension of the springs 43 is overcome and said conveyor pivots clockwise (FIG. 4). The arm is disengaged from the switch by pivoting of the transfer conveyor about the axis of the pin 41. Usually, the binding of long articles causes counter-clockwise pivoting, while clockwise pivoting results from the binding of short articles; however, long articles are subject to binding at any time and pivot the transfer conveyor clockwise when the outer ends bear against the inner end portion of said conveyor. Articles, such as lumber, which are warped or of irregular shape or size, may hang on the feed conveyors or machines. Also, the feed conveyors may become nonsynchronized and cause binding even when the articles are sufficiently uniform. In any event, the pivotal mounting of the transfer conveyor permits swinging movement thereof for actuating the stop switch to prevent damage to the conveyors, machines and other parts of the apparatus by binding of the articles. It is noted that limited pivotal movement of the transfer conveyor is permitted without actuating the switch and that, if the binding is only momentary, the springs impart reverse pivoting to said conveyor and reclose the switch. As shown by the numeral 60, the arm 58 may be adjustably mounted to permit variation of its projection and accurate adjustment relative to the switch.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A transfer conveyor for directing articles transversely from substantially horizontal conveying means including an upright endless conveyor extending transversely of the conveying means, a support for the conveyor, means connecting said conveyor to the support for pivotal movement in a plane substantially parallel to the conveying means and including a member attached to one end portion of said conveyor and support by a pair of upright pivots whereby either end of said conveyor may pivot in either direction relative to said support, and means resisting pivotal movement of said conveyor.

2. A transfer conveyor as set forth in claim 1 wherein the connecting means includes a bracket at one end of the upright endless conveyor for pivotal movement therewith, one of the upright pivots being carried by the bracket.

3. A transfer conveyor as set forth in claim 1 wherein the upright endless conveyor includes a frame slidable on the support, one of the upright pivots of the connecting means being carried by the frame.

4. A transfer conveyor as set forth in claim 3 wherein the upright endless conveyor includes upright pulleys at the ends of the frame, and an endless belt supported by the pulleys, one of said pulleys being driven, the upright pivot carried by said frame being adjacent the driven pulley.

5. A transfer conveyor as set forth in claim 1 wherein the upright endless conveyor includes a frame slidable on the support, and a bracket at one end of the frame, one of the upright pivots of the connecting means being mounted on the bracket.

6. A transfer conveyor for directing articles transversely from substantially horizontal conveying means including an upright endless conveyor extending transversely of the conveying means, a support for the conveyor, means connecting said conveyor to the support for pivotal movement in a plane substantially parallel to the conveying means and including a link pivotally attached to one end portion of the support and conveyor at spaced points for movement about upright substantially parallel axes whereby either end of said conveyor may pivot in either direction relative to said support, and means resisting pivotal movement of said conveyor.

7. A transfer conveyor as set forth in claim 1 wherein the resisting means includes springs connecting the end portions of the conveyor to the support.

8. A transfer conveyor for directing articles carried by a conveyor onto a substantially parallel conveyor including an upright endless conveyor extending at an angle to the substantially parallel conveyors, a support for the upright conveyor, a mounting pivotally connecting one end of said upright conveyor to the support and including a member pivotally attached to one end portion of said support and upright conveyor at spaced points for movement about upright axes whereby either end of said conveyor may pivot in either direction about the upright axes, and resilient means resisting pivotal movement of said upright conveyor.

9. A transfer conveyor as set forth in claim 8 wherein the mounting includes a pair of upright pivot pins on the upright conveyor and support for attaching the member thereto.

10. A transfer conveyor as set forth in claim 8 wherein the upright conveyor includes a frame slidable on the support, upright pulleys at the ends of the frame, and an endless belt supported by the pulleys, one of said pulleys being driven, the member having pivotal attachment with said frame adjacent the driven pulley.

11. A transfer conveyor as set forth in claim 10 wherein the mounting includes a bracket secured to one end of the frame and having the driven pulley mounted thereon, the member being pivotally attached to the bracket.

12. A transfer conveyor as set forth in claim 8 including means for limiting pivotal movement of the upright conveyor.

References Cited in the file of this patent
UNITED STATES PATENTS

| | | |
|---|---|---|
| 1,358,255 | Seufer et al. | Nov. 9, 1920 |
| 1,959,238 | Horsfield | May 15, 1934 |
| 2,335,646 | Chalmers | Nov. 30, 1943 |
| 2,359,252 | Seibert | Sept. 26, 1944 |
| 2,649,187 | Eggleston | Aug. 18, 1953 |